(12) United States Patent
Kim

(10) Patent No.: US 7,870,645 B2
(45) Date of Patent: *Jan. 18, 2011

(54) HINGE DEVICE AND MOBILE APPARATUS HAVING THE SAME

(75) Inventor: Jin-wook Kim, Gimcheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1042 days.

This patent is subject to a terminal disclaimer.

(21) Appl. No.: 11/589,719

(22) Filed: Oct. 31, 2006

(65) Prior Publication Data

US 2007/0136998 A1    Jun. 21, 2007

Related U.S. Application Data

(63) Continuation-in-part of application No. 11/447,121, filed on Jun. 6, 2006, now Pat. No. 7,703,177.

(30) Foreign Application Priority Data

Dec. 19, 2005    (KR) .................. 10-2005-0125570
Apr. 24, 2006    (KR) .................. 10-2006-0036748

(51) Int. Cl.
    *E05D 3/06*    (2006.01)
    *E05D 15/00*    (2006.01)

(52) U.S. Cl. ..................... 16/366; 16/239; 16/357; 16/360; 16/361; 16/362; 16/367

(58) Field of Classification Search ........... 16/337–339, 16/342, 330, 303, 374, 376, 377, 340, 355, 16/239, 357, 360, 361, 362, 367; 361/679.06, 361/379.07, 679.08, 679.12, 679.27; 455/90.3, 455/575.1, 575.3, 575.8; 379/433.12, 433.13; 348/373, 333.01, 333.06, 794
See application file for complete search history.

(56) References Cited

U.S. PATENT DOCUMENTS

| | | | | |
|---|---|---|---|---|
| 2,203,041 A * | 6/1940 | Bobek | ................... | 16/245 |
| 2,770,834 A * | 11/1956 | Jannace | ................ | 16/250 |
| 2,775,781 A * | 1/1957 | Morgan | ................ | 16/86 C |
| 4,683,614 A * | 8/1987 | Anderson | ............... | 16/362 |
| 4,852,032 A * | 7/1989 | Matsuda et al. | ......... | 361/679.27 |
| 5,061,023 A * | 10/1991 | Soubliere et al. | ......... | 312/223.4 |
| 5,107,402 A * | 4/1992 | Malgouires | ............ | 361/679.17 |

(Continued)

FOREIGN PATENT DOCUMENTS

CN    1620238 A    5/2005

(Continued)

*Primary Examiner*—Chuck Y. Mah
(74) *Attorney, Agent, or Firm*—Roylance, Abrams, Berdo & Goodman, L.L.P.

(57) ABSTRACT

A mobile device has a first object, a second object, and a hinge device to slide open and close the second object with respect to the first object. The hinge device has a sliding unit that is slidable with respect to a first object, and a rotary unit that is rotatable with respect to the sliding unit, and engaged with the second object. The hinge device requires a relatively smaller space to be installed in the mobile apparatus so that the mobile apparatus can be smaller. Furthermore, there is no installation line for the hinge device so that the aesthetic design of the mobile apparatus is more refined.

24 Claims, 15 Drawing Sheets

U.S. PATENT DOCUMENTS

| | | | |
|---|---|---|---|
| 5,169,221 A * | 12/1992 | Wheeler | 312/323 |
| 5,494,447 A * | 2/1996 | Zaidan | 439/31 |
| 5,946,774 A * | 9/1999 | Ramsey et al. | 16/357 |
| 6,233,138 B1 * | 5/2001 | Osgood | 361/679.05 |
| 6,381,125 B1 * | 4/2002 | Mizoguchi et al. | 361/679.08 |
| 6,381,128 B1 * | 4/2002 | Kramer | 361/679.55 |
| 6,658,272 B1 * | 12/2003 | Lenchik et al. | 455/575.1 |
| 7,278,184 B2 * | 10/2007 | Kuramochi | 16/357 |
| 7,443,979 B2 * | 10/2008 | Kim | 379/433.12 |
| 2001/0004269 A1 | 6/2001 | Shibata et al. | |
| 2004/0127266 A1 | 7/2004 | Aagaard et al. | |
| 2005/0044664 A1 * | 3/2005 | Chang | 16/327 |
| 2005/0050687 A1 | 3/2005 | Shiba | |
| 2005/0107137 A1 | 5/2005 | Byun et al. | |
| 2005/0122311 A1 | 6/2005 | Lee et al. | |
| 2006/0025184 A1 | 2/2006 | Cho et al. | |
| 2007/0067954 A1 * | 3/2007 | Finney et al. | 16/235 |

FOREIGN PATENT DOCUMENTS

| | | |
|---|---|---|
| CN | 1630312 A | 6/2005 |
| EP | 1 531 604 | 5/2005 |
| EP | 1 542 433 | 6/2005 |
| JP | 2005-054891 | 3/2005 |
| KR | 10-2003-0017321 | 3/2003 |

\* cited by examiner

HINGE DEVICE AND MOBILE APPARATUS HAVING THE SAME

CROSS-REFERENCE TO RELATED APPLICATIONS

This application is a continuation-in-part of application Ser. No. 11/447,121, filed Jun. 6, 2006 now U.S. Pat. No. 7,703,177, which claims the benefit under 35 U.S.C. §119(a) of Korean Patent Application No. 2005-125570 filed on Dec. 19, 2005, in the Korean Intellectual Property Office. This application also claims the benefit under 35 U.S.C. §119(a) of Korean Patent Application No. 2006-36748 filed on Apr. 24, 2006, in the Korean Intellectual Property Office. The entire disclosures of each of these applications are hereby incorporated by reference.

BACKGROUND OF THE INVENTION

1. Field of the Invention

The present invention relates to a mobile apparatus. More particularly, the present invention relates to a smaller, simpler hinge device, and a mobile apparatus having the same.

2. Description of the Related Art

A mobile apparatus such as a mobile phone or a camcorder has a display part that can rotate away from a main body. Accordingly, a user opens the display part of the mobile apparatus and moves the display part away from the main body by a predetermined distance to adjust a rotation angle of the display part. To do so, the display part of the mobile apparatus is hinged to the main body.

FIG. 1 illustrates an example of a conventional rotatable hinge device. Referring to FIG. 1, a conventional rotatable hinge device 10 comprises a main bracket 11 having a hinge unit 18, a shaft 12 rotatably engaged with a penetrating opening 11a of the main bracket 11, a pair of cams 13 and 14 that fit over the shaft 12 and restrain rotation of the main bracket 11, and an elastic member 15 disposed between the pair of cams 13 and 14 and the penetrating opening 11a to press the main bracket 11. A detector 16 may be formed above the cam 13 to operate a rotational angle sensing switch (not shown). A fixing member 17 is fixed under the shaft 12, and the elastic member 15 may include a spring washer. The pair of cams 13 and 14 comprise a lower cam 14 having a protrusion 14a to make a click when rotating, and an upper cam 13 having a recess 13a to receive the protrusion 14a. Accordingly, when the rotatable hinge device 10 rotates, the lower cam 14 and the upper cam 13 are placed into frictional contact with each other so that the hinge implements a free stop movement, and the protrusion 14a of the lower cam 14 and the recess 13a of the upper cam 13 impart the feeling of a click. The phrase free stop movement refers to the ability to stop at an arbitrary rotational angle, and hereinafter will be referred to as a free stop.

FIG. 2 is a front view of the rotatable hinge device when the rotatable hinge device is engaged with a mobile apparatus. As shown in FIG. 2, the fixing member 17 of the rotatable hinge device 10 fixes the shaft 12 to the display part 2, and the hinge unit 18 connects the shaft 12 to the main body 3 of the mobile apparatus.

FIGS. 3A and 3B are views of an upright camcorder 1 with the rotatable hinge device 10. FIG. 3A shows the display part 2 closed, and FIG. 3B shows the display part 2 opened.

Referring to FIGS. 3A and 3B, the display part 2 of the upright camcorder 1 can be rotated about an X axis of FIG. 3B by the rotatable hinge device 10 so that the display part 2 can be opened from the main body 3. When opened, the display part 2 can be rotated about a Z axis of an X-Y plane of FIG. 3B, that is, from the main body 3, by the shaft 12. Accordingly, a user rotates the display part 2 to adjust an angle of a screen when the display part 2 is opened from the main body 3. The upright camcorder 1 observes a subject using the display part 2 such as a liquid crystal display (LCD) instead of a general viewfinder.

The conventional rotatable hinge device 10 has relatively large-sized parts, such as the main bracket, so it occupies a large space in the mobile apparatus. Compact mobile apparatuses, such as an upright camcorder that uses a hard drive or flash memory, requires a more compact hinge device in comparison with a mobile apparatus that uses a deck unit and a magnetic recording medium, such as tape. Additionally, part of the conventional hinge device is exposed to the outside by an installation line L1. This interferes with the aesthetics of the mobile apparatus.

Accordingly, there is a need for a more compact hinge device for a mobile apparatus.

SUMMARY OF THE INVENTION

An aspect of the present invention is to address at least the above problems and/or disadvantages and to provide at least the advantages described below. Accordingly, an aspect of the present invention is to provide an improved hinge device that can be installed in a smaller area in comparison with a conventional rotatable hinge device.

Another aspect of the present invention is to provide a hinge device which does not reveal an installation line when installed in a mobile apparatus so that the mobile apparatus has a more refined design.

Yet another aspect of the present invention is to provide a mobile apparatus having the hinge device.

In accordance with an aspect of the present invention, a hinge device comprises a sliding unit slidable with respect to a first object, and a rotary unit rotatable with respect to the sliding unit, and engaged with a second object.

The sliding unit may comprise a sliding body and a first connection portion to engage the sliding body with the first object.

The sliding body may be curved.

The first connection portion may protrude from the sliding body.

The sliding body may comprise a first connection opening to receive the first connection portion and a second connection opening to receive the rotary unit.

The first connection portion may comprise a first elastic member inserted in the first connection opening and guide protrusions elastically supported at opposite ends of the first elastic member to protrude outside the sliding body.

The guide protrusions may slide along a guide recess in the first object.

The guide recess may be provided with a locking part, and the sliding body may comprise a locking protrusion corresponding to the locking part.

The rotary unit may comprise a rotary body engaged with the second object, a first rotary shaft disposed on the rotary body, and engaged with the second connection opening, a cam formed on the first rotary shaft to control rotation of the rotary body, and a second elastic member formed on the first rotary shaft to press the cam.

The rotary body may comprise a fixing member to fix the second object.

The rotary body may comprise a second connection portion rotatably engaged with the second object.

The second connection portion may comprise a third elastic member inserted in an axial opening formed in the rotary body and second rotary shafts elastically supported at opposite ends of the third elastic member to protrude out of the rotary body.

The cam may comprise a first cam having a protrusion and a second cam having a hole corresponding to the protrusion.

The rotary unit may further comprise a detector to detect the angle of rotation of the first rotary shaft.

The sliding body and the rotary body may each comprise a cable passageway formed therein.

The first object may comprise a body of a mobile device and the second object may comprise a display part.

The first object may comprise a display part of a mobile device, and the second object may comprise a body of the mobile device.

In accordance with another aspect of the present invention, a mobile device comprises a first object, a second object, and a hinge device to slide open and close the second object with respect to the first object.

The hinge device may allow the second object to slidably open the first object and rotate.

The hinge device may comprise a sliding unit that is slidable with respect to the first object and a rotary unit that is rotatable with respect to the sliding unit, and engaged with the second object.

The sliding unit may comprise a sliding body and a first connection portion to engage the sliding body with the first object.

The sliding body may be formed with a predetermined curvature.

The first connection portion may protrude from the sliding body.

The sliding body may comprise a first connection opening to accommodate the first connection portion and a second connection opening to accommodate the rotary unit.

The first connection portion may comprise a first elastic member inserted in the first connection opening and a guide protrusion elastically supported at opposite ends of the first elastic member to protrude outside the sliding body.

The guide protrusion may slide along a guide recess in the first object.

The guide recess may comprise a locking part and the sliding body may comprise a locking protrusion corresponding to the locking part.

The rotary unit may comprise a rotary body engaged with the second object, a first rotary shaft disposed on the rotary body and inserted into the second connection opening, a cam formed on the first rotary shaft to control the rotation of the rotary body, and a second elastic member formed on the first rotary shaft to press the cam.

The rotary body may comprise a fixing member to fix the second object.

The rotary body may comprise a second connection portion rotatably engaged with the second object.

The second connection portion may comprise a third elastic member inserted in an axial opening formed in the rotary body, and second rotary shafts elastically supported at opposite ends of the third elastic member to protrude out of the rotary body.

The cam may comprise a first cam comprising a protrusion and a second cam comprising a receiving hole corresponding to the protrusion.

The rotary unit further may comprise a detector to sense the angle of rotation of the first rotary shaft.

Each of the sliding body and the rotary body may comprise a cable passageway formed therein.

The hinge device may be formed inside the second object.

The hinge device may be formed at a corner of the second object.

The first object may be a main body, and the second object may be a display part.

The first object may be a display part, and the second object may be a main body.

In accordance with another aspect of the present invention, a mobile device comprises a main body, a display part, and a hinge device connecting the display part to the main body so that the display part can be opened with respect to the main body. The hinge device comprises a sliding unit that is engaged with and slidable with respect to the main body, the sliding unit having a cable passageway extending through the sliding unit, and a rotary unit that is engaged with and rotatable with respect to the sliding unit, and engaged with the display part, the rotary unit having a cable passageway extending through the sliding unit.

The sliding unit may comprise a sliding body and a first connection portion to engage the sliding body with the first object.

The sliding body may be curved.

The first connection portion may comprise guide protrusions that protrude from the sliding body to a guide recess in the main body.

The mobile device may further comprise means for retaining the sliding body in the guide recess.

The retaining means may comprise a locking part disposed on one of the sliding body and the guide recess, and a locking protrusion corresponding to the locking part disposed on the other of the sliding body and the guide recess.

The rotary unit may comprise a rotary body engaged with the second object, a first rotary shaft disposed on the rotary body, and inserted into a second connection opening on the sliding unit, a cam formed on the first rotary shaft to control the rotation of the rotary body, and a second elastic member formed on the first rotary shaft to press the cam.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
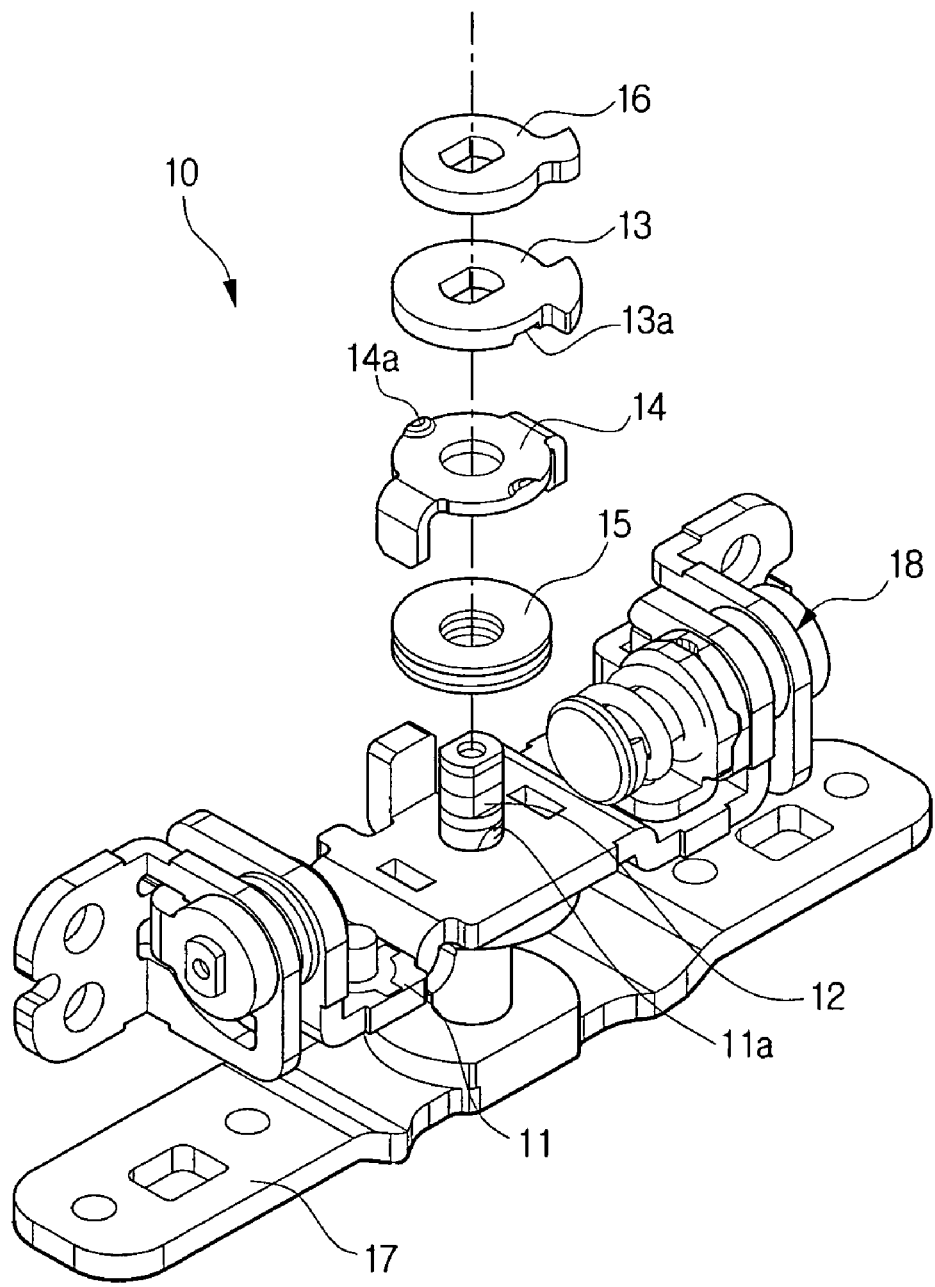
FIG. 1 is a perspective view of a conventional hinge device.
Figure 2:
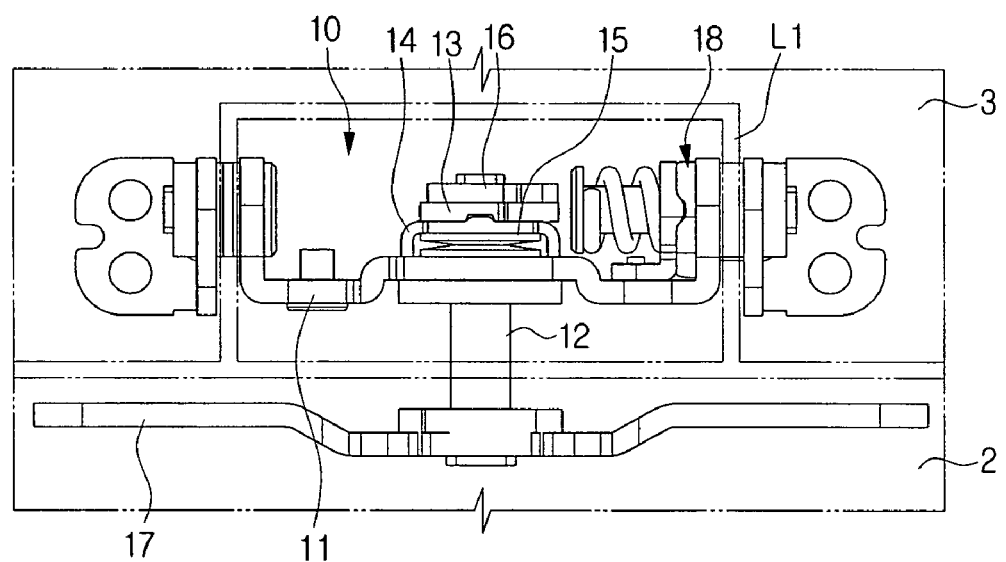
FIG. 2 is a front view of the hinge device of FIG. 1 when installed in a mobile apparatus.
Figure 3A:
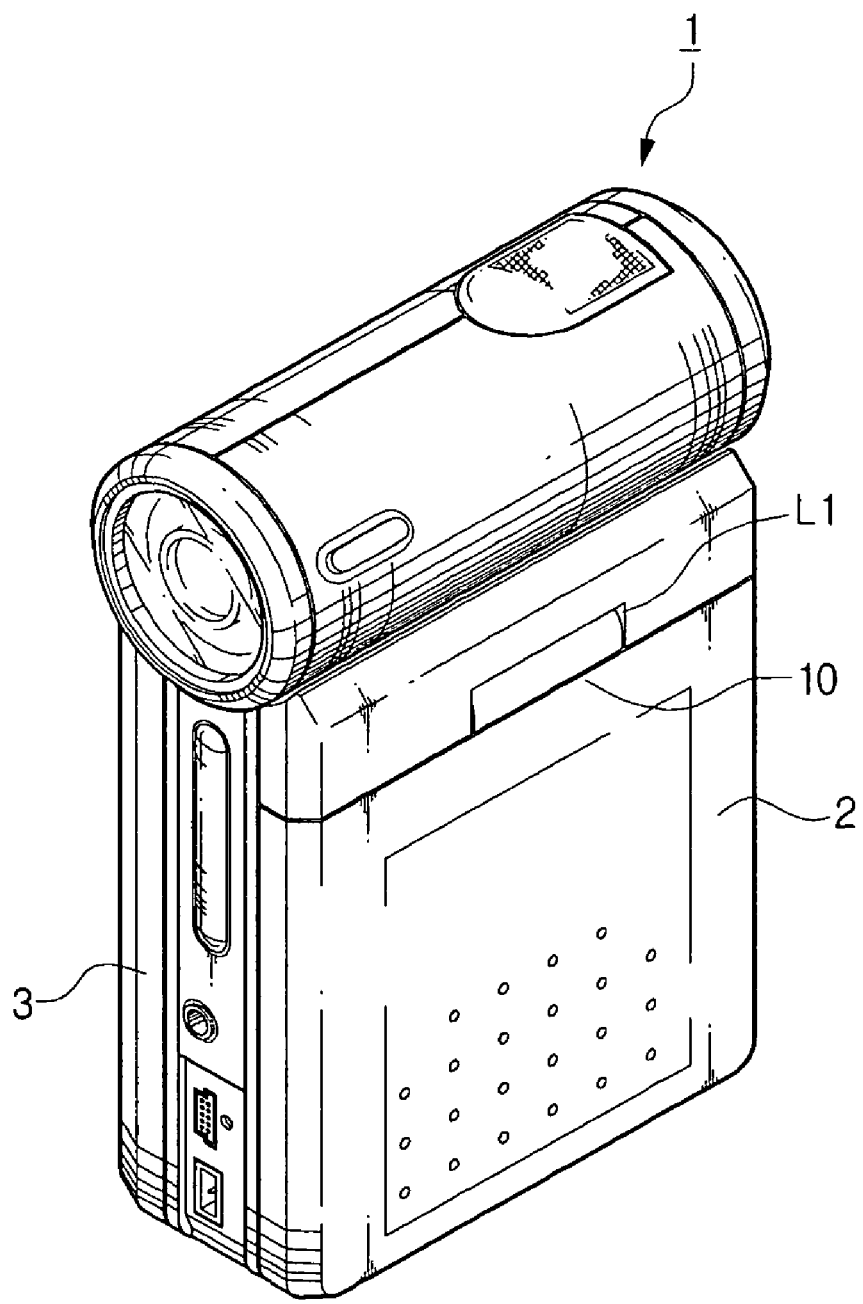
FIG. 3A is a perspective view of an upright camcorder having the hinge device of FIG. 1 with the display part closed.
Figure 3B:
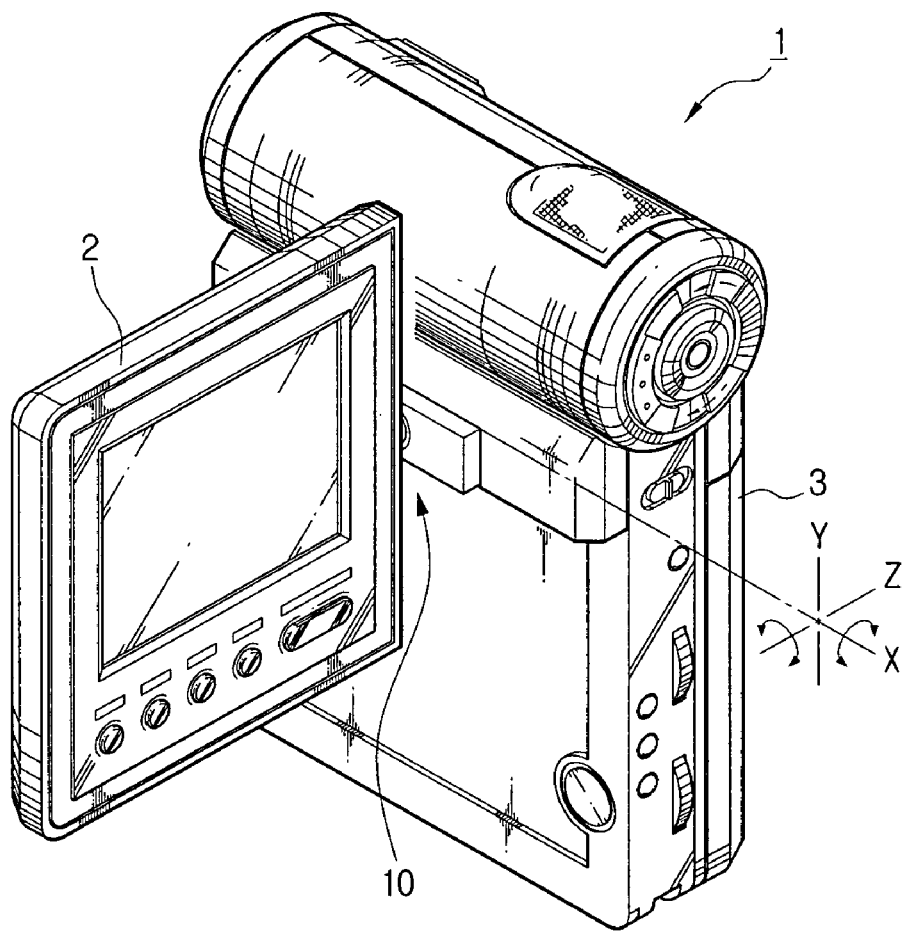
FIG. 3B is a perspective view of an upright camcorder having the hinge device of FIG. 1 with the display part opened.
Figure 4A:
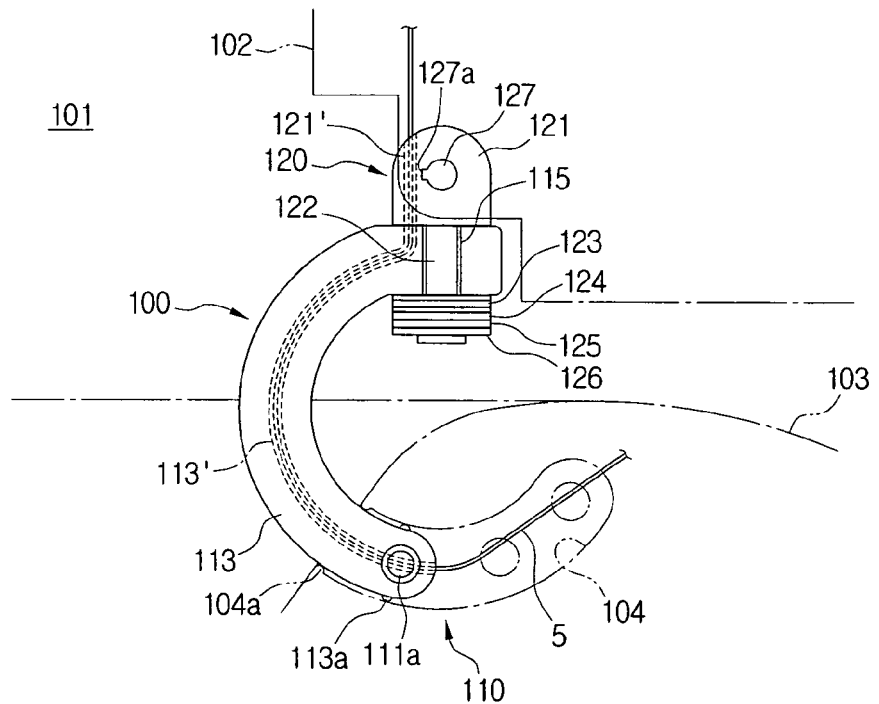
FIG. 4A is a front view of a hinge device according to a first exemplary embodiment of the present invention.
Figure 4B:
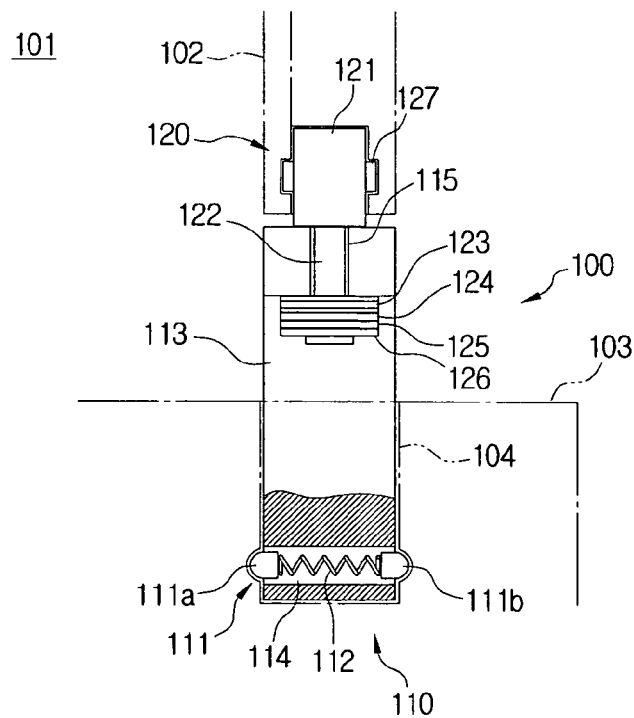
FIG. 4B is a side view of the hinge device of FIG. 4A.
Figure 5:
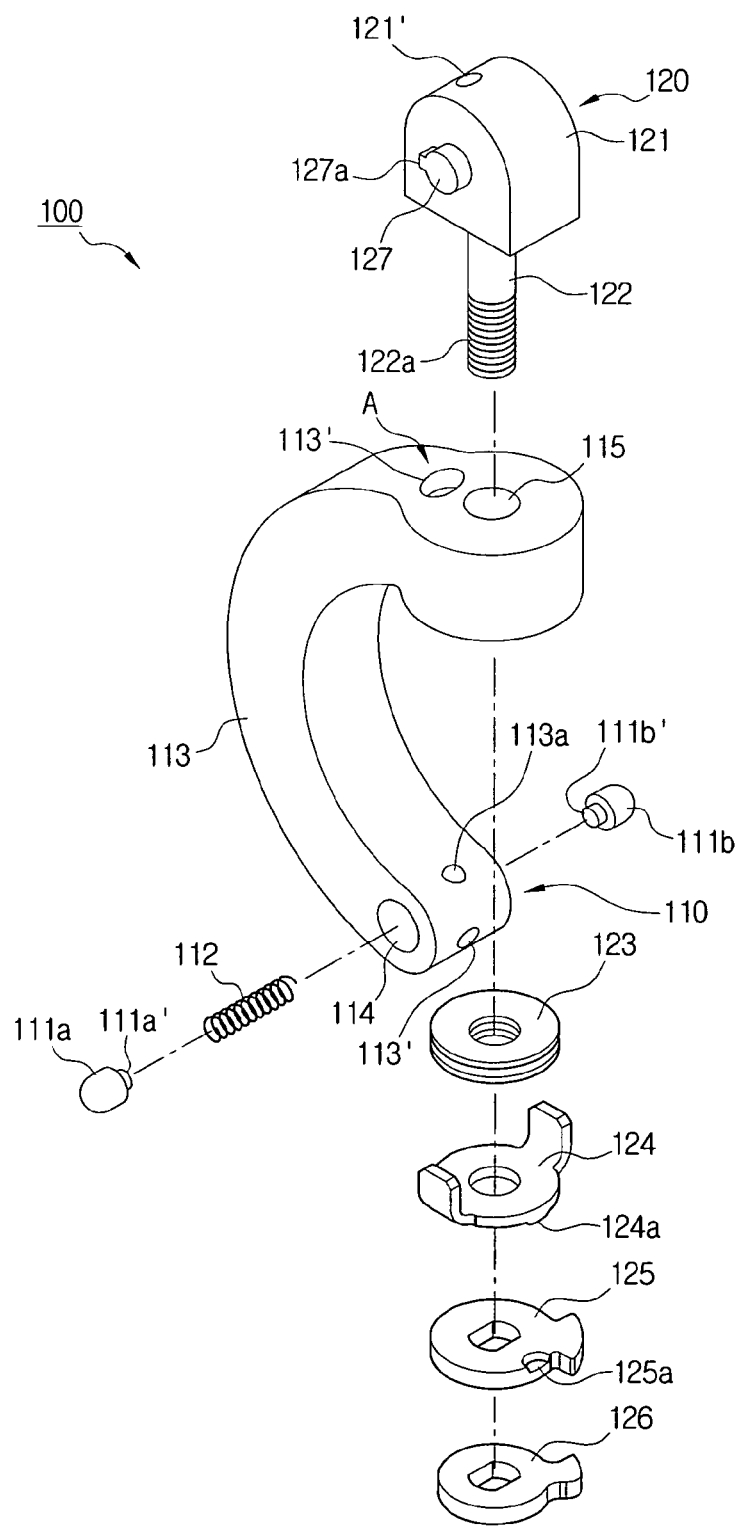
FIG. 5 is an exploded perspective view illustrating the hinge device of FIGS. 4A and 4B.

FIG. 4A is a front view of a hinge device according to a first exemplary embodiment of the present invention, FIG. 4B is a side view of the hinge device of FIG. 4A, and FIG. 5 is an exploded perspective view of the hinge device of FIG. 4A.

Referring to FIGS. 4A, 4B, and 5, a hinge device 100 according to an exemplary embodiment of the present invention comprises a sliding unit 110 that is slidable with respect to a first object, and a rotary unit 120 that is rotatable with respect to the sliding unit 110 and on which a second object is coupled. In the illustrated exemplary embodiment of the invention, the first and the second objects are the main body 103 and the display part 102, respectively. Alternative examples are also possible. For example, the first object may be the display part 102, while the second object may be the main body 103.

The sliding unit 110 comprises a sliding body 113 and a first connection portion 111 to connect the sliding body 113 with the first object, that is, with the main body 103.

The sliding body 113 may be curved. Alternatively, the sliding body 113 may be shaped in a linear fashion. The curvature of the sliding body 113 may be determined appropriately according to the size and specifications of the product. The sliding body 113 may have a cross-sectional shape which is a polygon. For example, the sliding body 113 may have a circular cross-sectional shape. The sliding body 113 may have a cable passageway 113' formed therein, through which a cable 5 is placed to carry signals between the main body 103 and the display part 102. The cable passageway 113' may be formed next to a second connection opening 115 which extends from one end to the other end of the sliding body 113 (see portion 'A' of FIG. 5). The cable passageway 113' may have a substantially oval shape. The sliding body 113 additionally comprises a first connection opening 114 formed on one end for engagement with the first connection portion 111, and the second connection opening 115 formed on the other end for engagement with the rotary unit 120. The second connection opening 115 may be formed substantially perpendicularly to the first connection opening 114. Alternatively, the second connection opening 115 may be formed at an angle with respect to the first connection opening 114.

The first connection portion 111 comprises a first elastic member 112 inserted in the first connection opening 114, and a pair of guide protrusions 111a and 111b. Opposite ends of the first elastic member 112 have a first guide protrusion 111a and a second guide protrusion 111b, respectively. The first and the second guide protrusions 111a and 111b protrude outside the sliding body 113. For example, the first connection opening 114 may extend vertically in the sliding body 113. In this case, the first and the second guide protrusions 111a and 111b protrude from upper and lower sides of the sliding body 113, respectively. Alternatively, the first connection opening 114 may be extend horizontally in the sliding body 113. In this case, the first and the second guide protrusions 111a and 111b protrude from left and right sides of the sliding body 113, respectively. The pair of guide protrusions 111a and 111b may have round or hemispherical surfaces. For example, the pair of guide protrusions 111a and 111b may be round balls or round rods. The pair of guide protrusions 111a and 111b each may have engagement protrusions 111a' and 111b' which face inward into the first connection opening 114 so as to be connected with the first elastic member 112. The first elastic member 112 fits over each engagement protrusion 111a' and 111b' of the pair of guide protrusions 111a and 111b to push the pair of guide protrusions 111a and 111b outward. Therefore, when the pair of guide protrusions 111a and 111b are slid along the guide recess 104 inside of the main body 103, the display part 102 engaged with the sliding body 113 can be arbitrarily stopped at any desired angle. In other words, a free stop can be implemented. The first connection portion 111 may be provided in various forms if the sliding body 113 is guided along the guide recess 104 to perform a free stop movement. A pair of locking parts 140a may be formed on upper and lower ends, or left and right ends, next to the mouth of the guide recess 104, while there are a pair of locking protrusions 113a formed on upper and lower ends, or left and right ends of one end of the sliding body 113, to engage with the locking parts 104a. Accordingly, the sliding body 113 is not easily separated from the guide recess 104.

The rotary unit 120 comprises a rotary body 121, a first rotary shaft 122, a second elastic member 123 and a pair of cams 124 and 125. The rotary body 121 is engaged with the second object which is the display part 102 in this embodiment. In the hinge device 100 according to the first exemplary embodiment of the present invention, the fixing member 127 is inserted into a fixing recess (not shown) of the display part 102 so as to engage the rotary body 121 with the display part 102. The fixing member 127 may be extended from a center of the rotary body 121 as a single member. Or, a separate axial opening may be formed on a central portion of the rotary body 121 and the fixing member 127 of a bar shape may be inserted into the penetrating opening. Irrespective of the shapes, the fixing member 127 has a fixing protrusion 127a so that the rotary body 121 is not separately rotated from the first rotary shaft 122. The rotary body 121 has a cable hole 121' formed therein. The cable hole 121' of the rotary body 121 may preferably be formed above the portion 'A' of the cable hole 113' of the sliding body 113 and in a fluid communication.

The first rotary shaft 122 is disposed on the rotary body 121 and is rotatably engaged with the sliding unit 110. More specifically, the rotary shaft 122 is disposed in the second connection opening 115 of the sliding body 113. Screw threads are formed at one end of the first rotary shaft 122, and the second elastic member 123 and the pair of cams 124 and 125 are sequentially engaged with the first rotary shaft 122. Although not shown, a separate cap is fastened with the screw threads of the first rotary shaft 122 to restrain the second elastic member 123 and the pair of cams 124 and 125. The first rotary shaft 122 and the rotary body 121 may be integrally formed. The rotary unit 120 may further include a detector 126 disposed on the first rotary shaft 122. The detector 126 is disposed above the pair of cams 124 and 125 to operate a rotational angle sensing switch (not shown) of the first rotary shaft 122.

The second elastic member 123 fits over the first rotary shaft 122 to press the pair of cams 124 and 125. The second elastic member 123 may include a spring washer.

The pair of cams 124 and 125 engage the second elastic member 123 of the first rotary shaft 122. The pair of cams 124 and 125 control rotation of the rotary body 121. The pair of cams 124 and 125 comprise a first cam 124 having a protrusion 124a, and a second cam 125 having a protrusion receiving recess 125a corresponding to the protrusion 124a. The pair of cams 124 and 125 generate the sense of a click when the first rotary shaft 122 rotates. Accordingly, when the first rotary shaft 122 rotates, the second elastic member 123 presses the first cam 124 and the second cam 125 together to generate friction so that a free stop rotary movement can be implemented and so that the protrusion receiving recess 125a of the second cam 125 and the protrusion 124a of the first cam 124 generate the sense of a click.

The particular exemplary embodiment of the rotary unit 120 described above is provided as an example, and should not be considered as limiting. The configuration of the rotary unit 120 according to the first exemplary embodiment of the present invention may be varied if the display part 102 may be rotated about 2 axes.

A mobile apparatus 101 having the hinge device 100 according to the first exemplary embodiment of the present invention comprises a main body 103, a display part 102, which can output image information from the main body 103, and the hinge device 100.

A guide recess 104 is formed in the main body 103 to accommodate the hinge device 100 so that it may slide. The shape of the guide recess 104 corresponds to the shape of the sliding body 113. That is, in the illustrated embodiment, the guide recess is curved. Accordingly, the hinge device 100 allows the display part 102 to be opened and closed along the guide recess 104 with respect to the main body 103. Additionally, the hinge device 100 is engaged by the sliding body 113 and slides along the guide recess 104 so that the space required by the hinge device 100 can be significantly reduced (as compared to conventional hinges).

The mobile apparatus 101 according to the first exemplary embodiment of the present invention may have the hinge device 100 on an inner surface of a top end of the display part 102. If formed on the inner surface of the display part 102, the hinge device 100 is hidden from the exterior of the display part 102.

Figure 6:
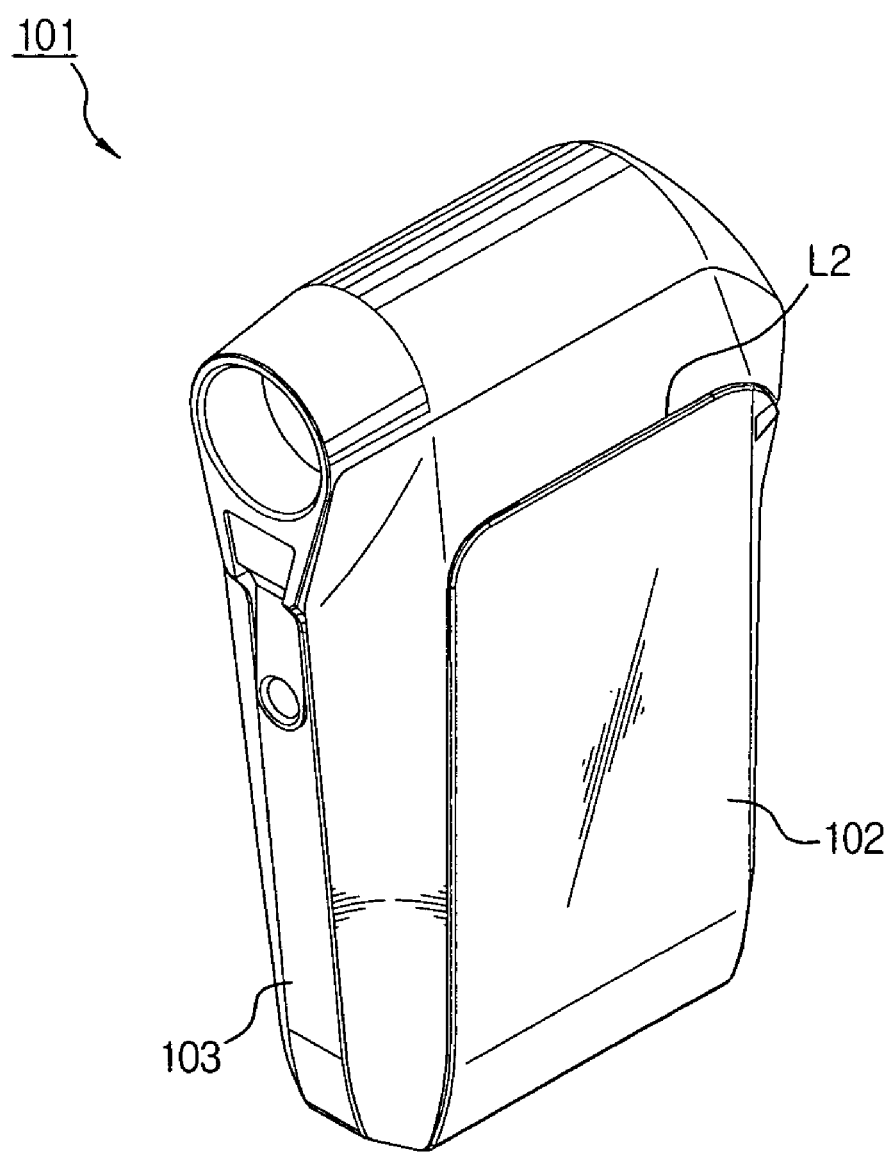
FIG. 6 is a perspective view of the exterior of an upright camcorder having the hinge device of FIGS. 4A and 4B.

FIG. 6 is a view of the exterior of an exemplary mobile apparatus (an upright camcorder) having the hinge device according to the first exemplary embodiment of the present invention. As shown in FIG. 6, the mobile apparatus 101 having the hinge device 100 according to the first exemplary embodiment of the present invention has no line at a portion where the hinge device 100 is installed and only an exterior line L2 at the top end of the display part 102 so that a more refined design is possible.

The operation of the mobile apparatus having the hinge device according to the first exemplary embodiment of the present invention will now be described with reference to the accompanying drawings.

FIGS. 7A through 7E illustrate the operation of an upright camcorder, which is a representative example of a mobile apparatus, having the hinge device according to the first exemplary embodiment of the present invention. As shown in FIGS. 7A through 7E, the hinge device 100 is engaged with one end of the upper portion of the display part 102 of the upright camcorder 101.

Figure 7A:
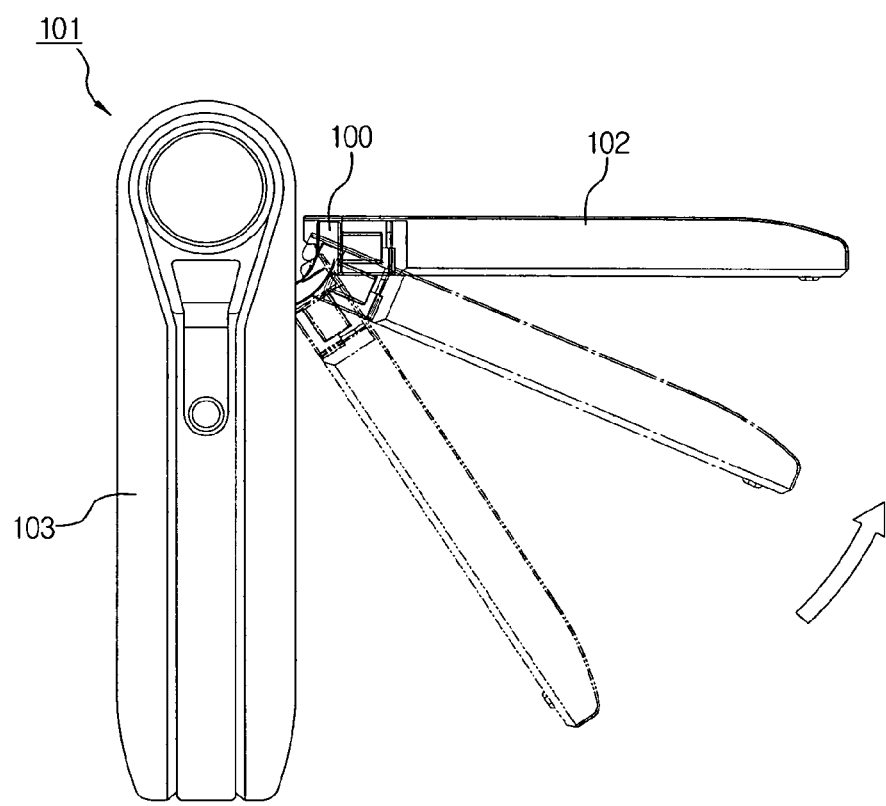
FIG. 7A through 7E are views illustrating the operation of an upright camcorder having a hinge device according to a first exemplary embodiment of the present invention.

First, as shown in FIGS. 4A and 7A, in the upright camcorder 101 according to the first exemplary embodiment of the present invention, the sliding body 113 of the hinge device 100 is slid along the guide recess 104 of the main body 103 to open and close the display part 102. During this movement, the display part 102 may perform a free stop at any desired angle, as shown in dotted lines of FIG. 7A. The locking protrusions 113a of the sliding body 113 are locked in the locking parts 140a of the guide recess 104 so that the sliding body 113 does not slide beyond a predetermined limit of the guide recess 104. Therefore, the sliding body 113 does not separate from the guide recess 104.

Figure 7B:
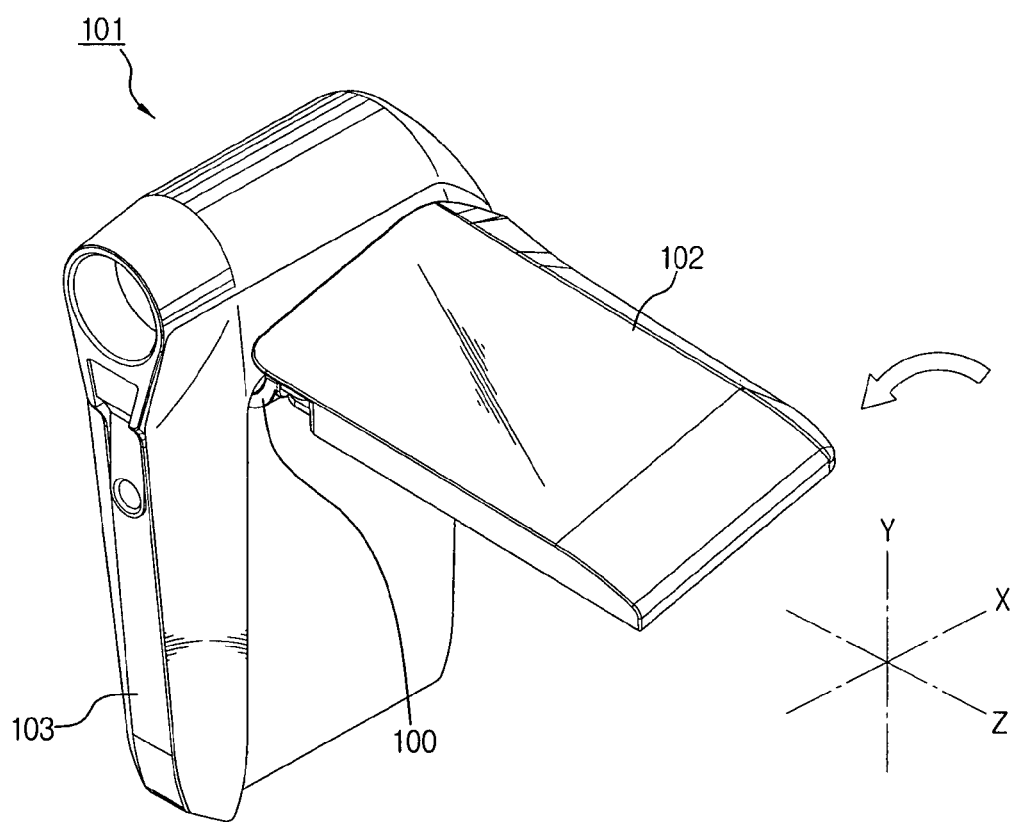

Additionally, regardless of the degree to which the sliding body 113 is opened and closed, the display part 102 can be rotated on an X-Y plane from the sliding body 113, that is, rotated about a Z axis, by the rotary unit 120, as shown in FIG. 7B.

Figure 7C:
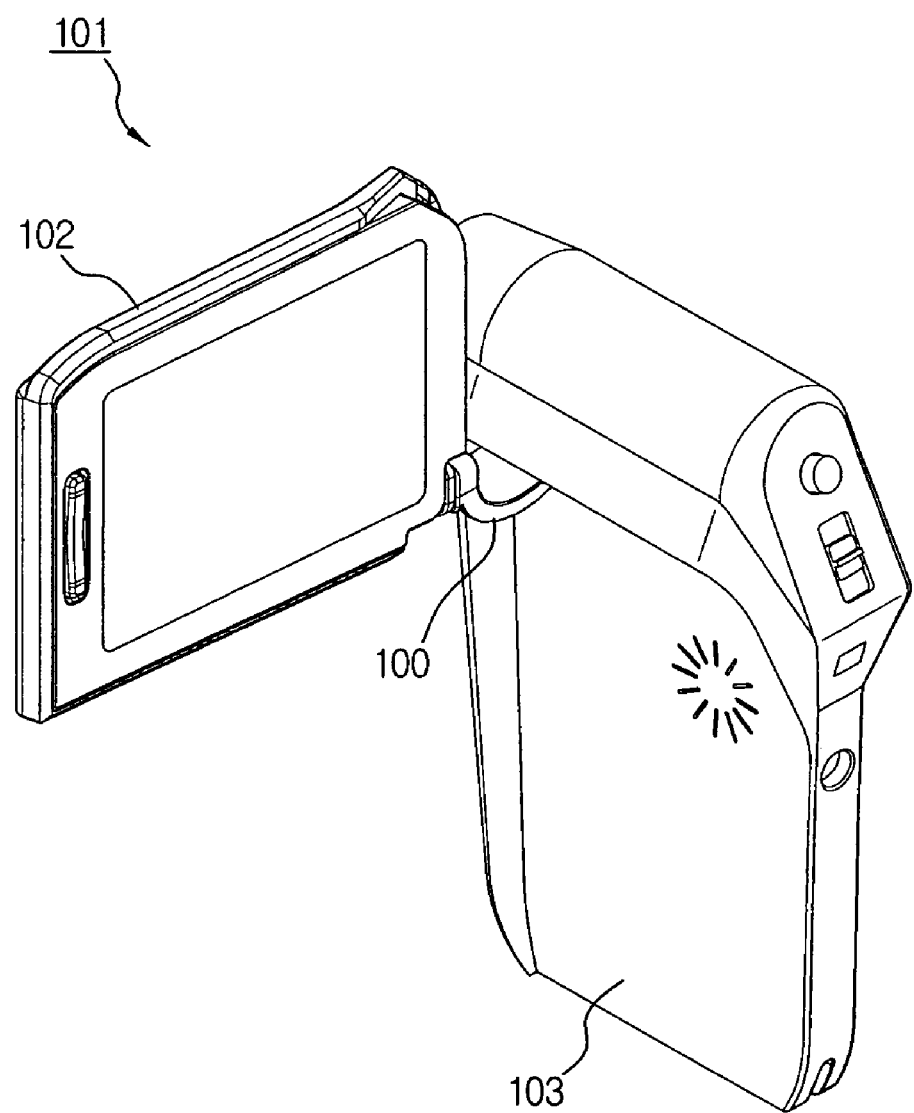

FIG. 7C illustrates a moving image photographing mode of the upright camcorder 101. This mode is convenient for a user to photographing a moving image while holding the upright camcorder 101 in the user's hands and viewing the display part 102.

Figure 7D:
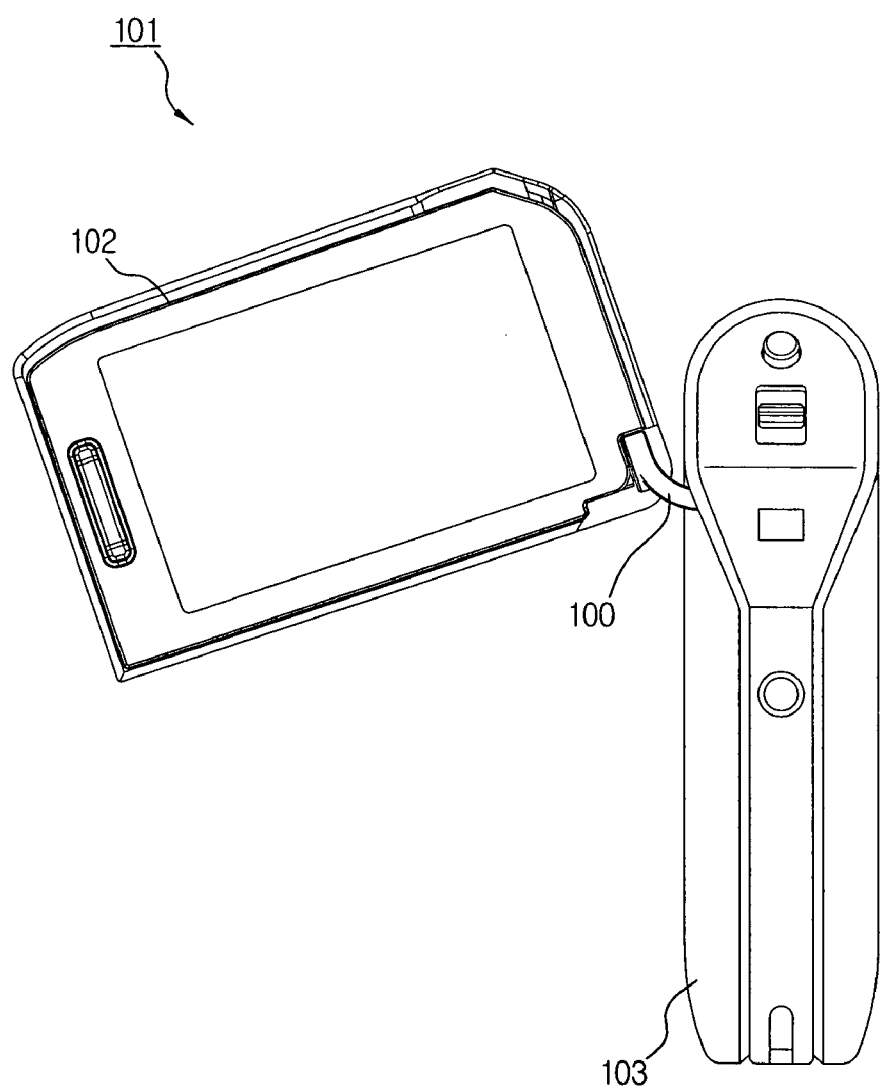
Figure 7E:
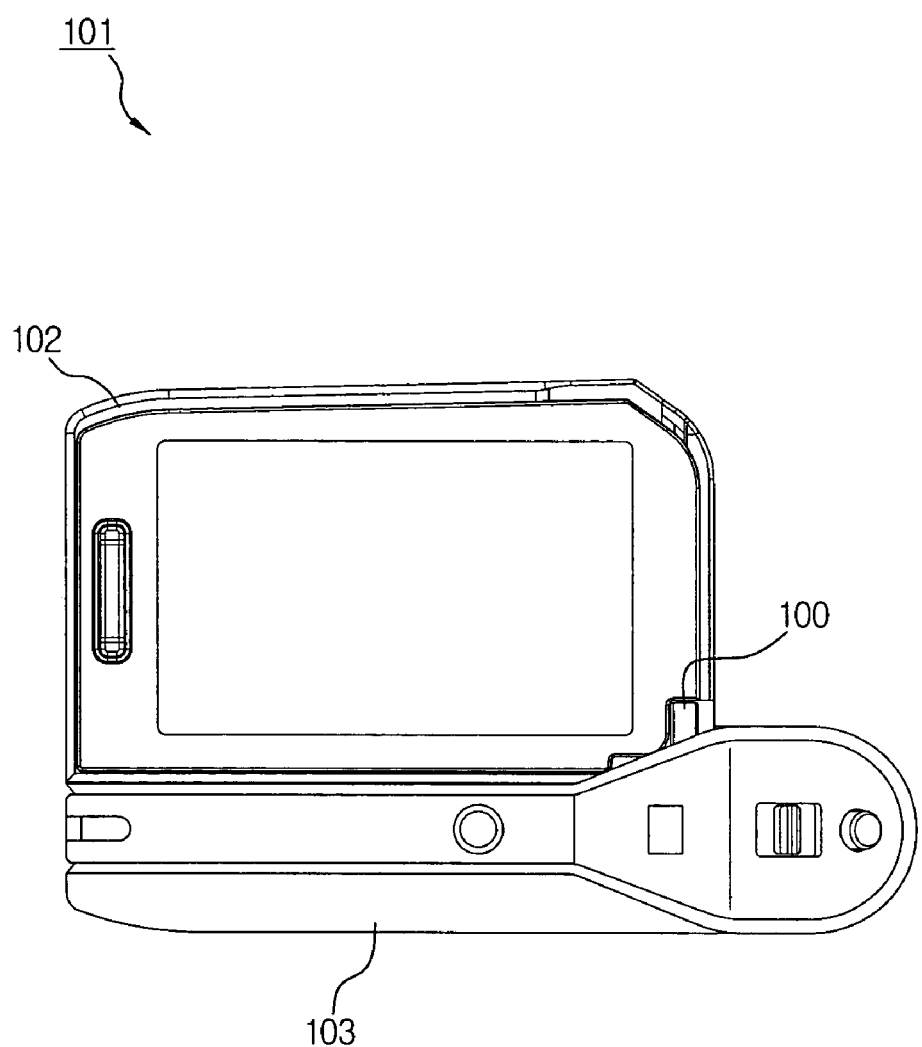

While in the moving image photographing mode of FIG. 7C, the sliding body 113 may be slid into the main body 103, as illustrated in FIG. 7D. When the sliding body 113 is slid into the main body 103, the upright camcorder 101 moves into the position shown in FIG. 7E. FIG. 7E illustrates a still image photographing mode. This mode is convenient for photographing a still image or reproducing and viewing still images. The mode of FIG. 7E provides a landscape mode, and is also suitable for watching digital multimedia broadcasting (DMB).

As described above, the mobile apparatus according to the first exemplary embodiment of the present invention has a display part that can be freely, smoothly, and conveniently operated.

Figure 8:
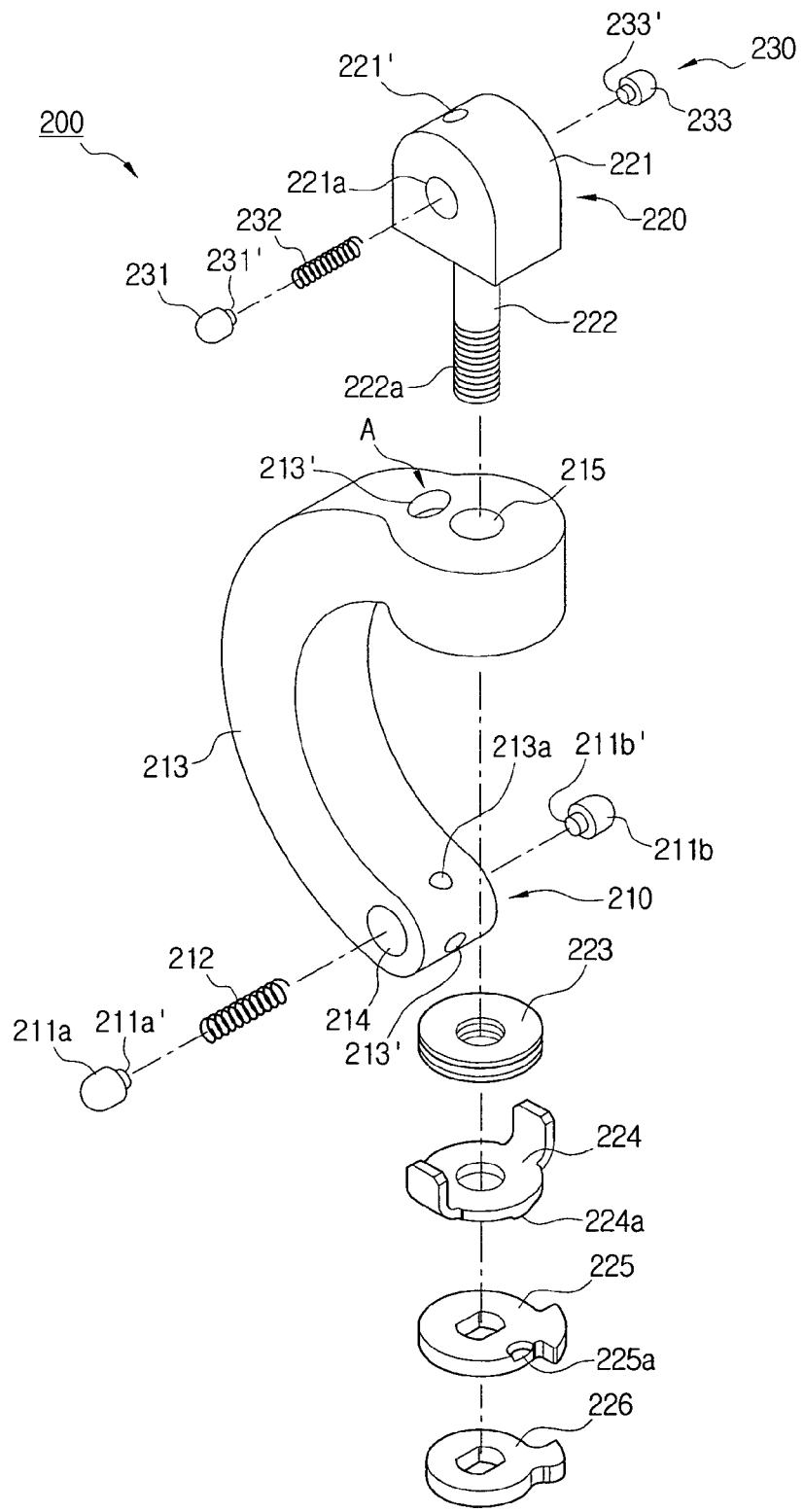
FIG. 8 is an exploded perspective view illustrating a hinge device according to a second exemplary embodiment of the present invention.

FIG. 8 is an exploded perspective view of a hinge device according to a second exemplary embodiment of the present invention.

Referring to FIG. 8, the hinge device 200 according to the second exemplary embodiment of the present invention has a structure in which the rotary body 221 of the rotary unit 220 is engaged with the display part 202 by a second connection portion 230 as briefly described above. The second connection portion 230 of the rotary body 221 according to the second exemplary embodiment of the present invention may have the same structure as the first connection portion 111 according to the first exemplary embodiment of the present invention.

In detail, the second connection portion 230 comprises a third elastic member 232 and a pair of second rotary shafts 231 and 233. The pair of second rotary shafts 231 and 233 protrude to the outside of the rotary body 221. The surfaces of the pair of second rotary shafts 231 and 233 may be round or hemispherical. For example, the pair of second rotary shafts 231 and 233 may be round balls or round rods. The pair of second rotary shafts 231 and 233 each may have engagement protrusions 231' and 233' which extend inward into an axial opening 221a so as to be connected with the third elastic member 232. The third elastic member 232 fits over each of the engagement protrusions 231' and 233' of the pair of second rotary shafts 231 and 233 to push the pair of second rotary shafts 231 and 233 outward. Accordingly, the pair of second rotary shafts 231 and 233 allow the display part 102 to arbitrarily stop at a desired angle, that is, a free stop can be implemented. For a more effective free stop function, the display part 202 has hemispheric recesses that correspond to the engagement protrusions 231' and 233' of the second rotary shafts 231 and 233 of the hinge device 200 according to the second exemplary embodiment of the present invention.

The remaining portions of the hinge device 200 are substantially the same as the hinge device 100 according to the first embodiment of the invention. Therefore, a detailed description of these portions will not be repeated for conciseness.

Figure 9A:
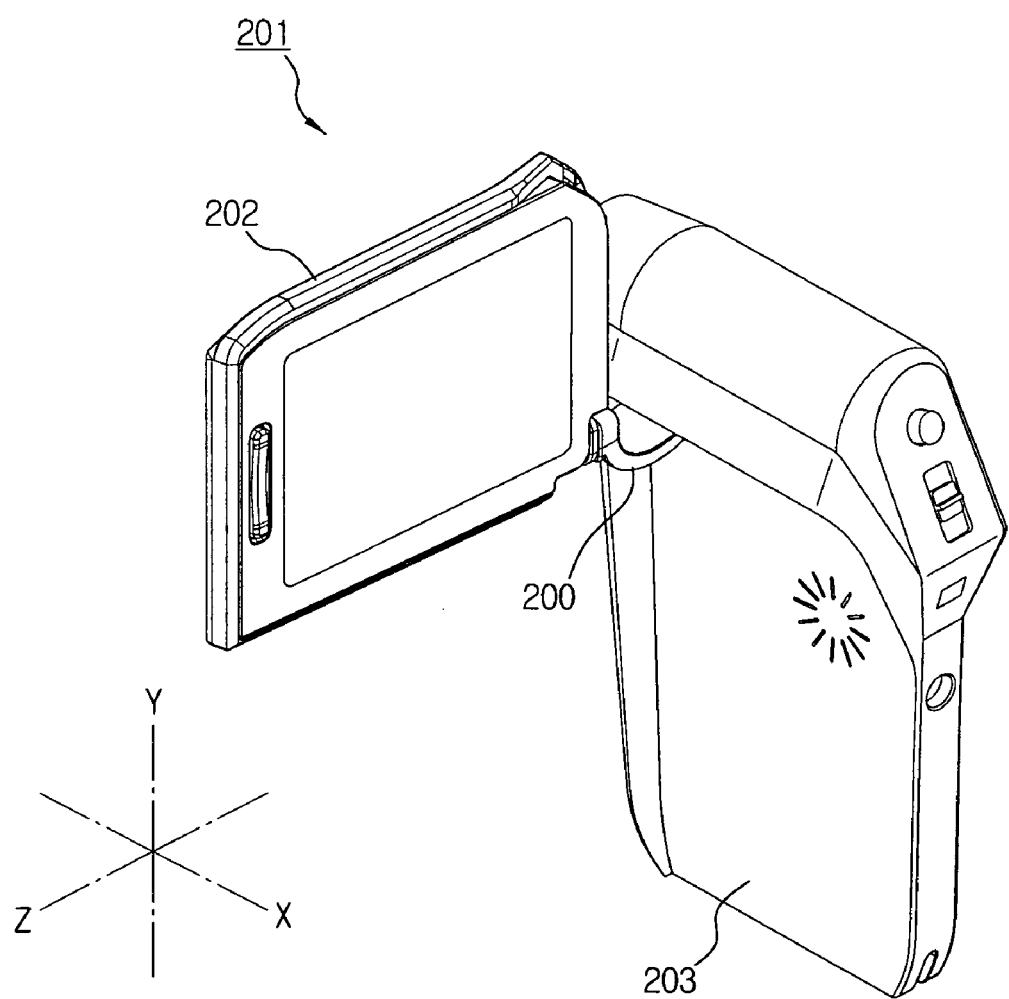
FIGS. 9A and 9B are views illustrating the operation of an upright camcorder having a hinge device according to a second exemplary embodiment of the present invention.
Figure 9B:
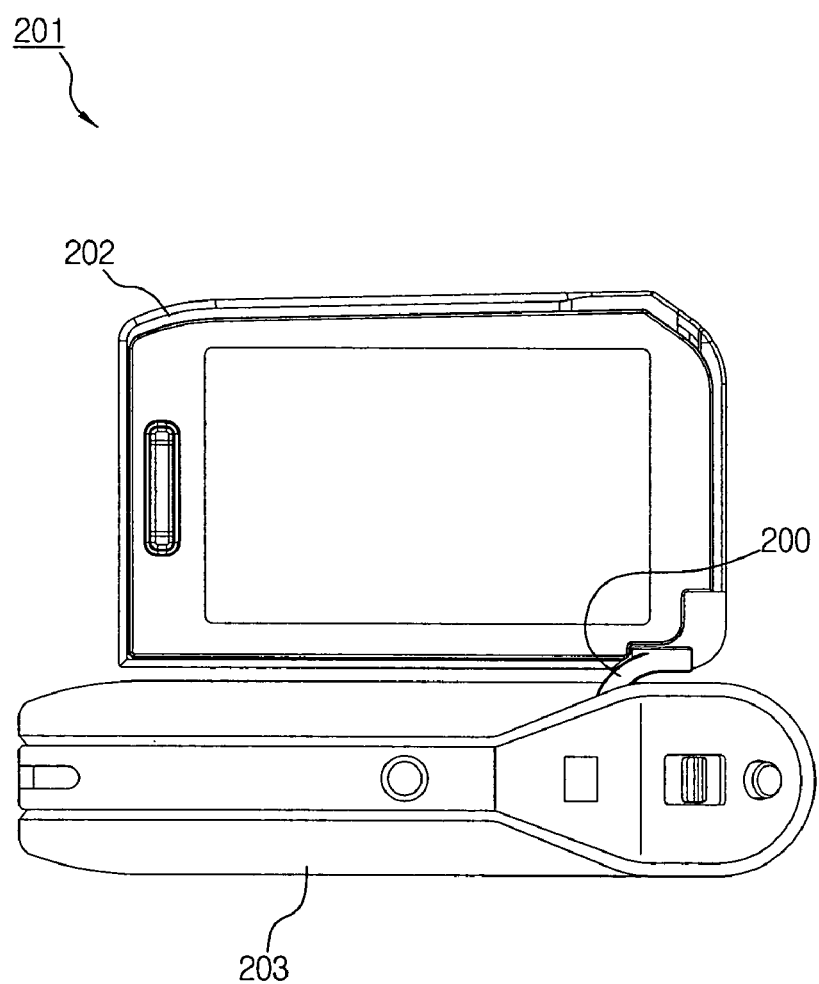

FIGS. 9A and 9B are views illustrating the operation of an upright camcorder having the hinge device 200 according to the second exemplary embodiment of the present invention. Referring to FIGS. 9A and 9B, the hinge device 200 according to the second exemplary embodiment of the present invention is engaged with one end of an upper portion of the display part 202 of the upright camcorder 201.

The upright camcorder 201 according to the second exemplary embodiment of the present invention can be rotated about an X axis by the sliding body 213. Specifically, even when the sliding body 213 is not slid into a main body 203, the upright camcorder 201 according to the second exemplary embodiment of the present invention can directly translate from the moving image photographing mode of FIG. 9A into the landscape mode of FIG. 9B by rotation of the second connection member 230.

The hinge device according to the exemplary embodiments of the present invention can be installed in a smaller space than a conventional rotatable hinge device so that the mobile apparatus may be more compact.

Further, a mobile apparatus having the hinge device according to exemplary embodiments of the present invention has no line for engaging the hinge device so that it has a more refined design in comparison with a conventional mobile apparatus.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A mobile device, comprising:
   a first object having a guide recess;
   a second object; and
   a hinge device to slide open and close the second object with respect to the first object, said hinge device having:
      a sliding unit engaging the guide recess to slide in and out of the first object; and
      a rotary unit engaged with the second object and rotatably connected to the sliding unit,
   wherein said sliding unit and said rotary unit each have a cable passageway extending respectively therethrough and communicating with each other to accommodate a cable for communicating signals between the first object and the second object.

2. The mobile device according to claim 1, wherein the hinge device allows the second object to slidably open the first object and rotate.

3. The mobile device according to claim 1, wherein the sliding unit comprises:
   a sliding body; and
   a first connection portion to frictionally engage the guide recess of the first object.

4. The mobile device according to claim 3, wherein the sliding body is formed with a predetermined curvature.

5. The mobile device according to claim 3, wherein the first connection portion protrudes from the sliding body.

6. The mobile device according to claim 3, wherein the sliding body comprises a first connection opening to accommodate the first connection portion, and a second connection opening to accommodate the rotary unit.

7. The mobile device according to claim 6, wherein the first connection portion comprises:
   a first elastic member inserted in the first connection opening; and
   at least one guide protrusion elastically supported at an end of the first elastic member to protrude outside the sliding body.

8. The mobile device according to claim 7, wherein the guide recess comprises a locking part and the sliding body comprises a locking protrusion corresponding to the locking part, to engage the locking part and hinder removal of the sliding body from the guide recess.

9. The mobile device according to claim 6, wherein the rotary unit comprises:
   a rotary body engaged with the second object;
   a first rotary shaft disposed on the rotary body, and inserted into the second connection opening;
   a cam formed on the first rotary shaft to control the rotation of the rotary body; and
   a second elastic member formed on the first rotary shaft to press the cam.

10. The mobile device according to claim 9, wherein the rotary body comprises a fixing member to fix the second object with respect to the rotary body.

11. The mobile device according to claim 9, wherein the rotary body comprises a second connection portion rotatably engaged with the second object.

12. The mobile device according to claim 11, wherein the second connection portion comprises:
   a third elastic member inserted in an axial opening formed in the rotary body; and
   second rotary shafts elastically supported at opposite ends of the third elastic member to protrude out of the rotary body.

13. The mobile device according to claim 9, wherein the cam comprises:
   a first cam comprising a protrusion; and
   a second cam comprising a receiving hole corresponding to the protrusion.

14. The mobile device according to claim 9, wherein the rotary unit further comprises a detector to sense the angle of rotation of the first rotary shaft with respect to the sliding body.

15. The mobile device according to claim 9, wherein each of the sliding body and the rotary body comprises a cable passageway formed therein.

16. The mobile device according to claim 1, wherein the first object is a main body, and the second object is a display part.

17. The mobile device according to claim 1, wherein the first object is a display part, and the second object is a main body.

18. A mobile device, comprising:
   a main body having a guide recess;
   a display part; and
   a hinge device connecting the display part to the main body so that the display part can be opened with respect to the main body, the hinge device comprising:
      a sliding unit that is engaged with and slidable in and out of the guide recess of the main body, the sliding unit having a cable passageway extending through the sliding unit; and
      a rotary unit that is engaged with and rotatable with respect to the sliding unit, and engaged with the display part, the rotary unit having a cable passageway extending through the rotary unit and communicating with the cable passageway of the sliding unit, the cable passageways accommodating a cable to communicate signals between the main body and the display part.

19. The mobile device according to claim 18, wherein the sliding unit comprises:
 a sliding body; and
 a first connection portion to engage the sliding body with the guide recess.

20. The mobile device according to claim 19, wherein the sliding body is curved.

21. The mobile device according to claim 20, wherein the first connection portion comprises guide protrusions that protrude from the sliding body to engage the guide recess in the main body.

22. The mobile device according to claim 21, further comprising means for retaining the sliding body in the guide recess.

23. The mobile device according to claim 22, wherein the retaining means comprises:
 a locking part disposed on one of the sliding body and the guide recess; and
 a locking protrusion corresponding to the locking part disposed on the remaining one of the sliding body and the guide recess.

24. The mobile device according to claim 18, wherein the rotary unit comprises:
 a rotary body engaged with the display part;
 a first rotary shaft disposed on the rotary body, and inserted into a second connection opening on the sliding unit;
 a cam formed on the first rotary shaft to control the rotation of the rotary body; and
 a second elastic member formed on the first rotary shaft to press the cam.

* * * * *